(No Model.)
T. McHUGH.
VALVE FOR WATER CLOSET CISTERNS.
No. 365,617. Patented June 28, 1887.
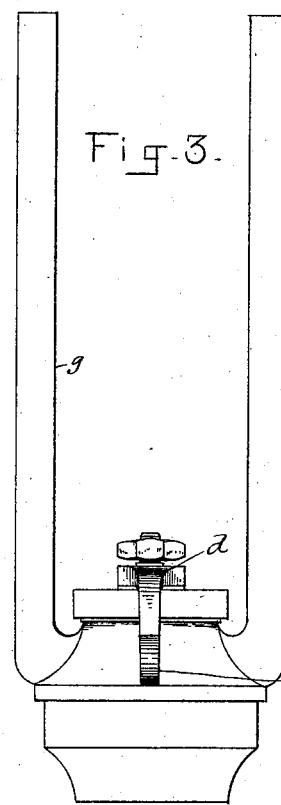
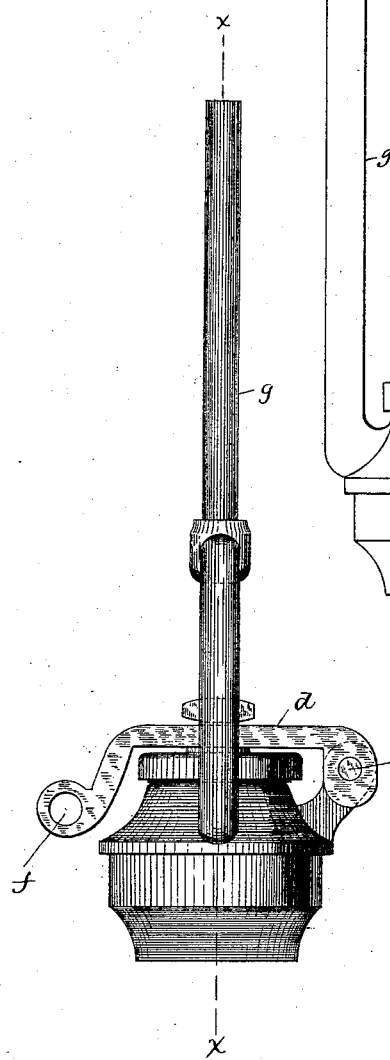
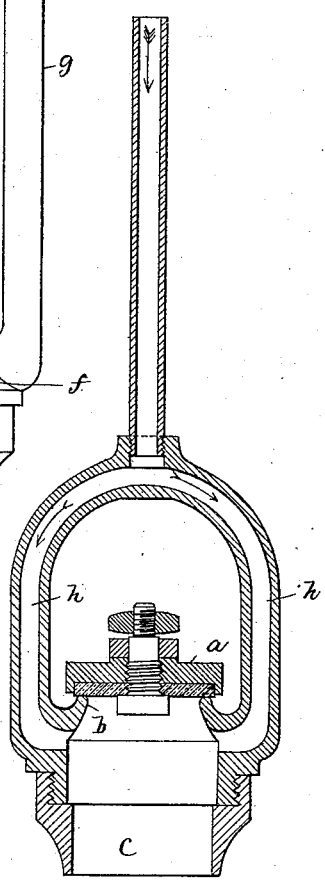
WITNESSES:
Horace Brown
D. W. Foster
INVENTOR:
Timothy McHugh
by Wright, Brown & Crossley
Attorneys

UNITED STATES PATENT OFFICE.

TIMOTHY McHUGH, OF BOSTON, MASSACHUSETTS, ASSIGNOR OF ONE-HALF TO WARD & CURLEY, OF SAME PLACE.

VALVE FOR WATER-CLOSET CISTERNS.

SPECIFICATION forming part of Letters Patent No. 365,617, dated June 28, 1887.

Application filed August 23, 1886. Serial No. 211,635. (No model.)

*To all whom it may concern:*

Be it known that I, TIMOTHY McHUGH, of Boston, in the county of Suffolk and State of Massachusetts, have invented certain new and useful Improvements in Valves for Water-Closet Cisterns, of which the following is a specification.

My invention relates to valves and their associated contrivances employed in water-closet cisterns and similar connections, and has for its object to provide improved devices connected with the overflow or stand pipe, which will obviate the noise now occasioned by the displacement of air when the valve is operated.

My invention consists in the improvements, which I will now proceed to describe in connection with the accompanying drawings, forming a part of this specification, so that others skilled in the art may be able to make and use the same, the invention being set forth with distinctness, and particularly in the claim hereto appended.

Of the drawings, Figure 1 represents a side elevation of my invention. Fig. 2 represents a longitudinal section thereof on the line $x\ x$ of Fig. 1, and Fig. 3 represents a longitudinal section of a modified form of the invention.

The same letters of reference indicate the same parts in all of the figures.

$a$ represents the valve, which may be of any suitable form or construction.

$b$ represents the valve-seat, and $c$ the outlet port or pipe. The valve is connected to a lever, $d$, hinged or pivoted at $e$ to a lug or stud on the base of the valve-seat, which lever is provided at its free end with an eye, $f$, to which a chain, rod, or other similar appliance for raising the valve may be attached, all of common form and arrangement, and as clearly portrayed in the drawings.

$g$ represents the overflow-pipe arranged vertically over the center of the valve $a$, and connected at its lower end with the branch pipes $h\ h$, which communicate with the outlet port or pipe $c$ just below the valve-seat $b$, and on opposite sides thereof, as fully shown in Fig. 2. By this arrangement of the overflow-pipe and its connections with the outlet port or pipe $c$, when the valve is closed after having been operated to admit the flow of water through the outlet-port, the air rushing into the pipes, to take the place of the outflowing water therein, will be so circulated as to obviate the disagreeable sucking and hissing noise occasioned in valves as now commonly constructed. The result mentioned accomplished in a valve constructed in accordance with my invention is attained by admitting air to the outlet port or pipe at opposite different points underneath the valve, as hereinbefore set forth. This result flows from the fact that one current of air so counteracts the other or others as to avoid a whistling or sucking noise, and it may be due to other reasons with which I am not now fully familiar. Additional pipes might be connected with the lower end of the stand or overflow pipe and the outlet port or pipe below the valve with the same result, provided such pipes are so arranged as that the currents of air admitted shall oppose each other; but I find two such branch pipes, as shown and arranged, to be sufficient in most instances.

As has been intimated, the pipes $g\ h\ h$ serve the purpose, in addition to that to which attention has been particularly directed, of an overflow-pipe of ordinary construction.

In Fig. 3 I have shown a modified construction. In this instance the outlet port or pipe is provided with a plurality of overflow or stand pipes connected with the outlet port or pipes at opposite points—that is, instead of connecting the pipes $h\ h$ with the pipe $g$, they are extended upward independent of any other pipe or pipes. Though this construction might not be so convenient as that shown in Figs. 1 and 2, it is obvious that it would operate with the same result.

I am aware that valves for cisterns as heretofore constructed have been provided with an overflow-pipe connecting with the outlet-port below the valve and its seat. This construction, however, which I hereby disclaim, is incapable of accomplishing the functions attained and designed to be secured by my improvements—viz., the avoidance of the disagreeable or whistling noise attendant upon the operation of the valve.

What I claim is—

The combination, with the valve and its seat, of the outlet port or pipe, the overflow-pipe $g$, and the two branch pipes $h\,h$, connected at their upper ends with the lower end of the overflow-pipe and at their lower ends with the outlet port or pipe at opposite sides thereof and below the valve-seat, as set forth.

In testimony whereof I have signed my name to this specification, in the presence of two subscribing witnesses, this 24th day of June, 1886.

TIMOTHY McHUGH.

Witnesses:
ARTHUR W. CROSSLEY,
C. F. BROWN.